(12) United States Patent
Brodsky et al.

(10) Patent No.: US 6,418,482 B1
(45) Date of Patent: Jul. 9, 2002

(54) REFERENCE ATTRIBUTES WITHIN AN OBJECT-ORIENTED SYSTEM

(75) Inventors: Stephen A. Brodsky, Los Gatos; Gary Charles Doney, Sunnyvale; Michael Morris Golding, Palo Alto; Timothy James Grose, Sunnyvale, all of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/850,847

(22) Filed: Aug. 4, 1997

Related U.S. Application Data

(63) Continuation-in-part of application No. 08/747,415, filed on Nov. 12, 1996, now Pat. No. 5,893,913, and a continuation-in-part of application No. 08/747,414, filed on Nov. 12, 1996, now Pat. No. 6,011,559, and a continuation-in-part of application No. 08/747,416, filed on Nov. 12, 1996, now Pat. No. 5,917,498, and a continuation-in-part of application No. 08/747,057, filed on Nov. 12, 1996, now Pat. No. 5,907,706, and a continuation-in-part of application No. 08/747,058, filed on Nov. 12, 1996, now Pat. No. 5,983,016, and a continuation-in-part of application No. 08/747,417, filed on Nov. 12, 1996, now Pat. No. 5,991,536.

(51) Int. Cl.$^7$ .................. G06F 9/00; G06F 15/16
(52) U.S. Cl. .................. 709/313; 709/315; 709/238
(58) Field of Search .................. 709/105, 303, 709/316, 313, 315, 238

(56) References Cited

U.S. PATENT DOCUMENTS

| | | | | |
|---|---|---|---|---|
| 5,485,617 A | * | 1/1996 | Stutz et al. | 395/700 |
| 5,551,035 A | * | 8/1996 | Arnold et al. | 395/650 |
| 6,243,763 B1 | * | 6/2001 | Brodsky et al. | 709/316 |
| 6,243,764 B1 | * | 6/2001 | Leach et al. | 709/316 |

* cited by examiner

Primary Examiner—Zarni Maung
(74) Attorney, Agent, or Firm—Gates & Cooper LLP (57) ABSTRACT

A method, apparatus, and article of manufacture for sending messages between objects in an object-oriented system. A reference attribute for a first object is defined, wherein the reference attribute refers to a second object. A message then may be sent from the first object to the second object using the reference attribute to route the message from the first object to the second object.

15 Claims, 9 Drawing Sheets

REFERENCE ATTRIBUTES WITHIN AN OBJECT-ORIENTED SYSTEM

CROSS-REFERENCE TO RELATED APPLICATIONS

This application is a continuation-in-part of the following co-pending and commonly-assigned patent applications:

Application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky et al., now U.S. Pat. No. 5,893,913, issued on Apr. 13, 1999;

Application Ser. No. 08/747,414, entitled "LAYOUT METHOD FOR ARC-DOMINATED LABELLED GRAPHS," filed on Nov. 12, 1996, by Dipayan Gangopadhyay, et al., now U.S. Pat. No. 6,011,559, issued on Jan. 4, 2000;

Application Ser. No. 08/747,416, entitled "MULT-OBJECT VIEWS IN AN OBJECT MODELING TOOL," filed on Nov. 12, 1996, by Roni Korenshtein, now U.S. Pat. No. 5,917,498, issued on Jun. 29, 1999;

Application Ser. No. 08/747,057, entitled "INTERACTIVE MODELING AGENT FOR AN OBJECT-ORIENTED SYSTEM," filed on Nov. 12, 1996, by Stephen A. Brodsky et al., now U.S. Pat. No. 5,907,706, issued on May 25, 1999;

Application Ser. No. 08/747,058, entitled "EXECUTION ENGINE IN AN OBJECT MODELING TOOL," filed on Nov. 12, 1996, by Stephen A. Brodsky et al., now U.S. Pat. No. 5,983,016, issued on Nov. 9, 1999;

Application Ser. No. 08/747,417, entitled "NOTIFICATION MANAGER FOR OBJECT-ORIENTED SYSTEMS," filed on Nov. 12, 1996, by Stephen A. Brodsky et al., now U.S. Pat. No. 5,991,536, issued on Nov. 23, 1999;

all of which applications are incorporated by reference herein.

This application is also related to the following co-pending and commonly-assigned patent applications:

Application Ser. No. 08/850,829, entitled "METHOD FOR SYNCHRONIZATION BETWEEN LINKS AND GROUP DEFINITIONS WITHIN AN OBJECT-ORIENTED SYSTEM," filed on May 2, 1997, by Stephen A. Brodsky, et al., now U.S. Pat. No. 6,237,142, issued on May 22, 2001;

Application Ser. No. 08/850,858, entitled "OBJECT OUTLINE VIEW FOR GROUPS WITHIN AN OBJECT-ORIENTED SYSTEM," filed on May 2, 1997, by Stephen A. Brodsky, et al., Application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed May 2, 1997, by Stephen A. Brodsky, et al., now U.S. Pat. No. 6,243,763, issued on Jun. 5, 2001;

Application Ser. No. 08/850,832, entitled "CHANGE AND ACCOUNTING LOG FOR OBJECT-ORIENTED SYSTEMS," filed on May 2, 1997, by Stephen A. Brodsky, et al., now U.S. Pat. No. 5,895,472, issued on Apr. 20, 1999;

Application Ser. No. 08/850,838, entitled "MODEL TRACE VIEW FOR OBJECT-ORIENTED SYSTEMS," filed on May 2, 1997, by Stephen A. Brodsky et al., now U.S. Pat. No. 5,960,199, issued on Sep. 28, 1999;

Application Ser. No. 08/850,337, entitled "FRACTAL NESTED LAYOUT FOR HIERARCHICAL SYSTEMS," filed on May 2, 1997, by Stephen A. Brodsky, now U.S. Pat. No. 6,122,634, issued on Sep. 19, 1999;

all of which applications are incorporated by reference herein.

BACKGROUND OF THE INVENTION

1. Field of the Invention

This invention relates generally to object-oriented environments, and in particular to a method for sending or broadcasting messages to one or more objects, groups of objects, or lists of objects within an object-oriented system.

2. Description of Related Art.

In object-oriented systems, there is often a need to send messages between objects, groups of objects, and lists of objects. Current methods for performing this task are not structured and are often complex. Such complex methods often result in numerous errors and inefficiencies throughout the object-oriented system, and are overly inflexible.

Object-oriented systems often use many objects working in concert to perform complex tasks. One of the most important aspects of object-oriented systems is the relationships between objects. In executing programs, such as compiled C++ programs, references are typically stored as machine language addresses. However, some object-oriented systems may include the interactions of objects, groups of objects, and lists of objects which do not have known machine addresses.

There is a need then for a method of specifying references to objects in a human understandable format. There is also a need then for a straightforward, efficient method for broadcasting messages within an object-oriented system.

SUMMARY OF THE INVENTION

To overcome the limitations in the prior art described above, and to overcome other limitations that will become apparent upon reading and understanding the present specification, the present invention discloses a method, apparatus, and article of manufacture for sending messages between objects using reference attributes in an object-oriented system. A reference attribute for a first object is defined, wherein the reference attribute refers to a second object. A message then may be sent from the first object to the second object using the reference attribute to route the message from the first object to the second object.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

When executing instructions in an object-oriented system having one or more object models, references are usually stored as machine language addresses. However, users may be designing the interactions of objects for a system which does not have known addresses. To allow for creation of these references, the present invention provides a facility in an object-oriented system which allows the logical references to be captured by reference attributes using object names. These names enable the user to quickly specify and identify the objects, groups of objects, or lists of objects in their model. Without this capability, an object-oriented system would be unable to represent object interactions, because the references could not be specified prior to execution. Reference attributes of the present invention are a key enabling technology for object-oriented systems.

Reference attributes allow a user to send a message to an object, group of objects, or list of objects. The values of the reference attributes are legal, unique object names. A user uses reference attributes to send a message to the object whose name is stored in the reference attribute.

Users can send a different object the same message by setting the value of the reference attribute to the name of a different object. The code the user writes to send the message is identical.

For example, a user can create an object Object1 in an object model of the object-oriented system, with Object2 and Object3 contained in Object1. The user can create a reference attribute REF in Object1 and set its value to Object2. The user can then write an invocation of method m1 as REF.m1( ), in which m1 will be sent to Object2 when the statement is executed. The message that is sent to Object2 is m1, and the target of the message is the value of REF. If the user wanted to send m1( ) to Object3, the user simply needs to change the value of REF to Object3.

The valid values for a reference attribute are the name of an object, group, or list, or a blank field. Each object in an object model has a unique name. A valid object name begins with an underscore character (_) or a letter, followed by any number of underscores, letters, or numbers. The letters can be either upper case or lower case.

An extended name format is available for specifying object names in other models of the object-oriented system by using, e.g., two slashes to indicate that the object is in another model. Other characters besides slashes can be used to separate object names and model names. For example, the name of object "Object5" in model "Model2" when called by model "Model1" is //Model2/Object5.

The object name reflects the containment relationship in the objects. The name of a sub-object is the name of the top-most container object, the next container object, etc. and the sub-object itself, separated by a slash. The unique name begins with a slash.

In the example above, Object1 contains Object2 and Object3. The unique name of Object1 is Object1, the unique name of Object2 is /Object1/Object2, and the unique name of Object3 is /Object1/Object3.

It is also possible to specify a relative name for the value of a reference attribute. A relative name has the same format as a unique name, but it does not begin with a slash. Each relative name can be transformed into a unique name by appending the relative name to the unique name of the object that contains the reference attribute, e.g., the relative name Object2 is identical to the unique name Object1/Object2, since the reference attribute REF belongs to Object1.

Hardware Environment

Figure 1:
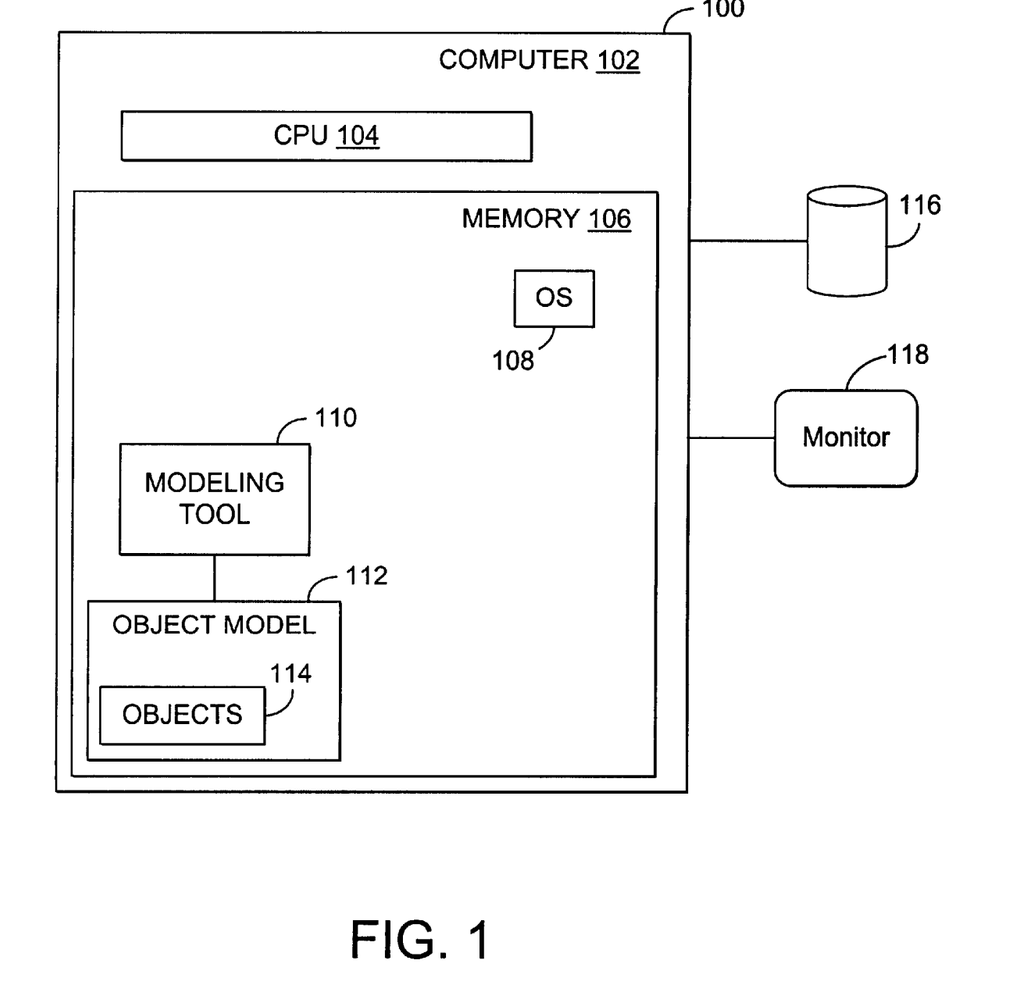
FIG. 1 illustrates an exemplary hardware environment that could be used to implement the present invention.

FIG. 1 illustrates an exemplary hardware environment 100 that could be used to implement the present invention. The hardware environment includes a computer 102, which comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably an object-oriented system that is implemented using one or more data structures and computer programs operating under the control of the operating system 108. More specifically, the present invention includes an object modeling tool 110, an object model 112, and various objects 114 contained within the object model 114.

In the preferred embodiment, the operating system 108, the object modeling tool 110, the object model 112, and the objects 114 are all tangibly embodied in a computer-readable medium, e.g., memory 106 or data storage device 116, which could include one or more fixed or removable data storage devices, such as a removable cartridge drive, floppy disc drive, hard drive, CD-ROM drive, tape drive, etc. The computer 102 displays characters, text, and graphics on a monitor 118 which allows a user to view what operations the computer 102 is performing using modeling tool 110. Further, the operating system 108 and the object modeling tool 110 are comprised of instructions which, when read and executed by the computer 102, cause the computer 102 to perform the steps necessary to implement and/or use the present invention. Of course, those skilled in the art will recognize many modifications may be made to this configuration without departing from the scope of the present invention.

Object Model

Figure 2:
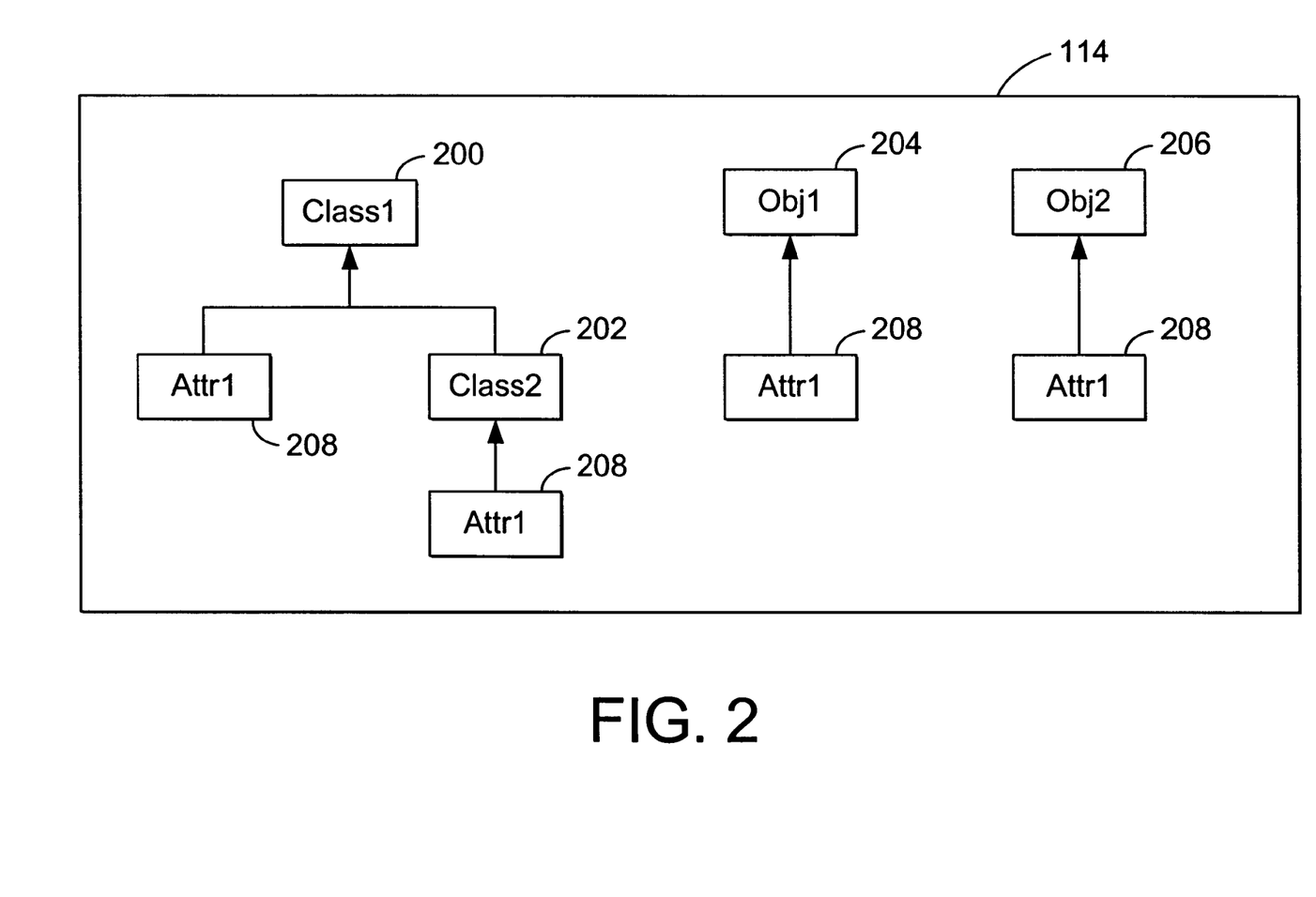
FIG. 2 is a block diagram illustrating the structure of an exemplary object model according to the present invention.

FIG. 2 is a block diagram illustrating the structure of an exemplary object model 112 according to the present invention. In the object model 112, Class2 202 is a subclass of Class1 200. Object1 (Obj1) 204 is an instance of Class1 200 and Object2 (Obj2) 206 is an instance of Class2 202.

Class1 200 and Class2 202 both include Attribute1 (Attr1) 208. Attribute1 208 is synchronized with Object1 204, which is an instance of Class1 200. Attribute1 208 is also synchronized with Object2 206, which is an instance of Class2 202. The attributes are identified as Class1/Attribute1, Class2/Attribute1, Object1/Attribute1, and Object2/Attribute1.

Object Composition View

Figure 3:
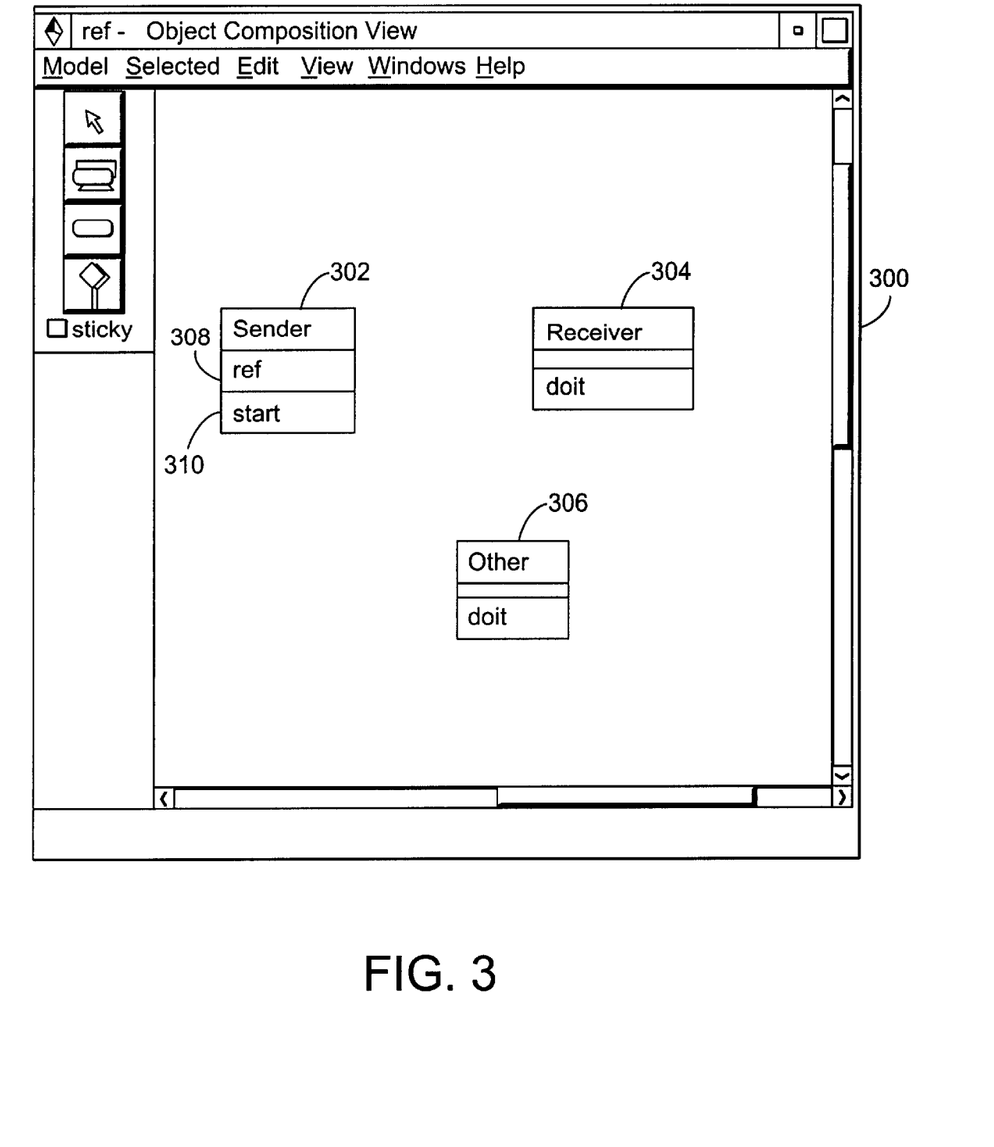
FIG. 3 illustrates an Object Composition View window displayed by the object modeling tool according to the present invention.

FIG. 3 illustrates an Object Composition View window 200 displayed by the object modeling tool 110 according to the present invention. Window 300 is a typical Object Composition View (OCV) window used to create objects 114 in the object model 112. The window 300 shown has three objects 114 already created: object Sender 302, object Receiver 304, and object Other 306. The names of objects 302–306 are shown in the uppermost part of the icons within window 300.

In the present example, the user would like to program object Sender 302 to send a message, e.g., "doit( )" to object Receiver 304, but not to object Other 306.

To send the message, object Sender 302 is given a property called a reference attribute 308, which is given a name, e.g., "ref." Reference attribute 308 contains the name of the object that doit( ) should be sent to, e.g., "/Receiver" to designate object Receiver 304 as the recipient of the message. Reference attribute 308 can be given multiple values, such as "/Receiver, /Other" to indicate that more than one object within the object model 112 is to receive the message. Further, reference attribute 308 can use a nesting structure to designate an object or sub-object within another object by specifying the path name of the desired object in the reference attribute 308.

Window 300 shows the objects 302–306 in a 3-pane view style. The top pane contains the object name, the second pane, e.g., reference attribute 308, lists the attributes associated with the object, and the third pane lists the events associated with the object, which are the messages an object can receive. As shown in FIG. 3, object Sender 302 has a name, "Sender" in the top pane, reference attribute 308 named "ref" in the second pane, and event 310 named "start" in the third pane.

Attributes in an Object Properties Notebook

Figure 4:
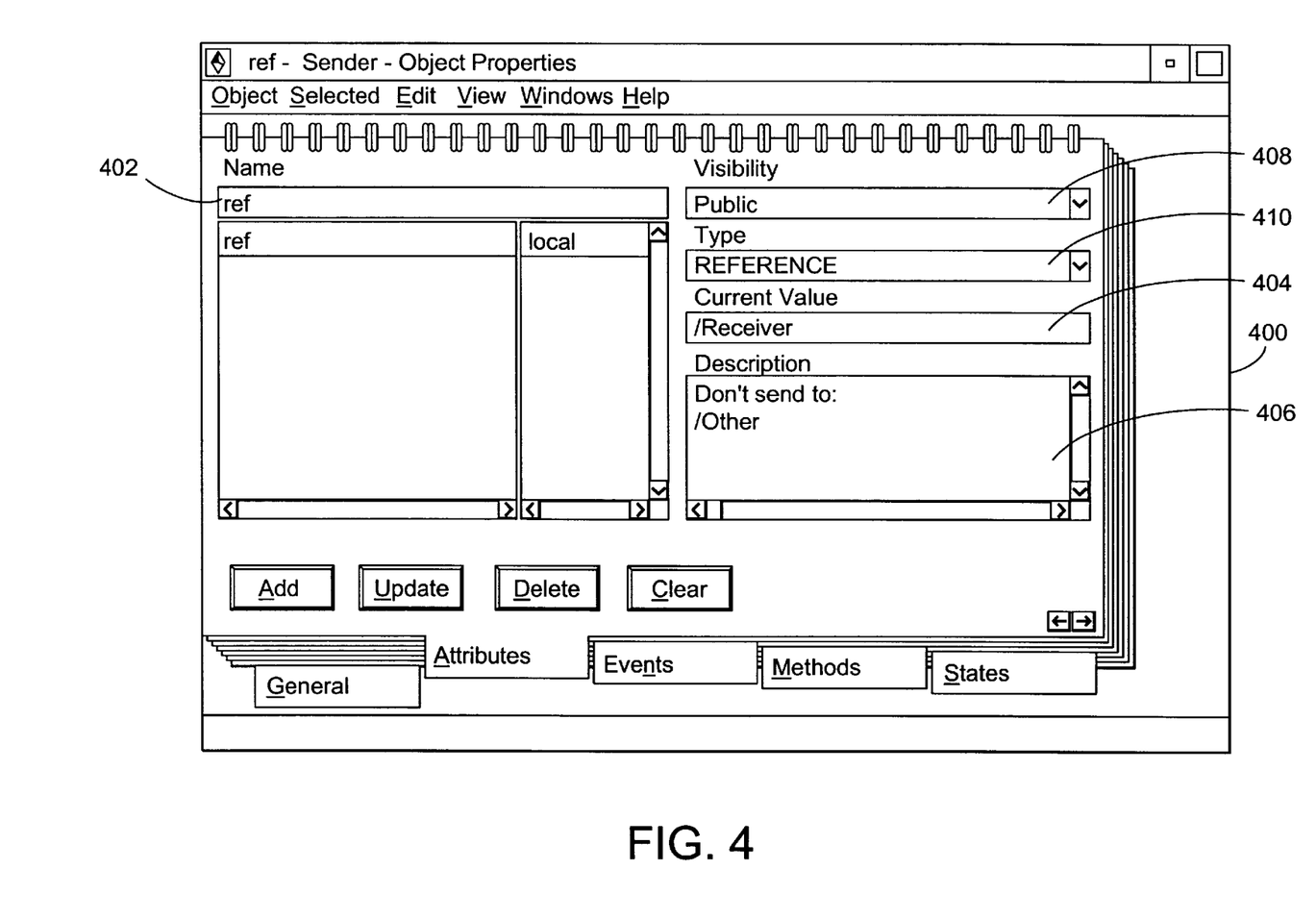
FIG. 4 illustrates an Attributes window of an Object Properties Notebook displayed by the object modeling tool according to the present invention.

FIG. 4 illustrates an Attributes window 400 of an Object Properties Notebook displayed by the object modeling tool 110 according to the present invention. To expand on the reference attribute 308 named "ref," window 400 can be opened by the user to enter information regarding the reference attribute 308. A name field 402 is displayed to allow the user to define the name, e.g., "ref," of the reference attribute 308.

The current value field 404 lists the destination for the message, in this case, object Receiver 304, listed in path name format e.g., "/Receiver."

The description field 406 allows the user to place comments or other descriptive language for ease of use of the reference attribute. In this case, the description field 406 contains a comment that the message will not be sent to object Other 306.

The visibility field 408 can be either public or private. If the visibility field is private, then only objects within the same class can receive the message via the reference attribute 308. If the visibility field 408 is public, then any object can receive the message via the reference attribute 308.

The type field 410 allows the user to choose the type of property associated with the attribute of the object. The present invention allows the user to select a value for the type field 410 that makes the attribute a reference attribute. In FIG. 4, the type field 410 contains the type "REFERENCE" to designate this property of the object as a reference attribute.

Events in an Object Properties Notebook

Figure 5:
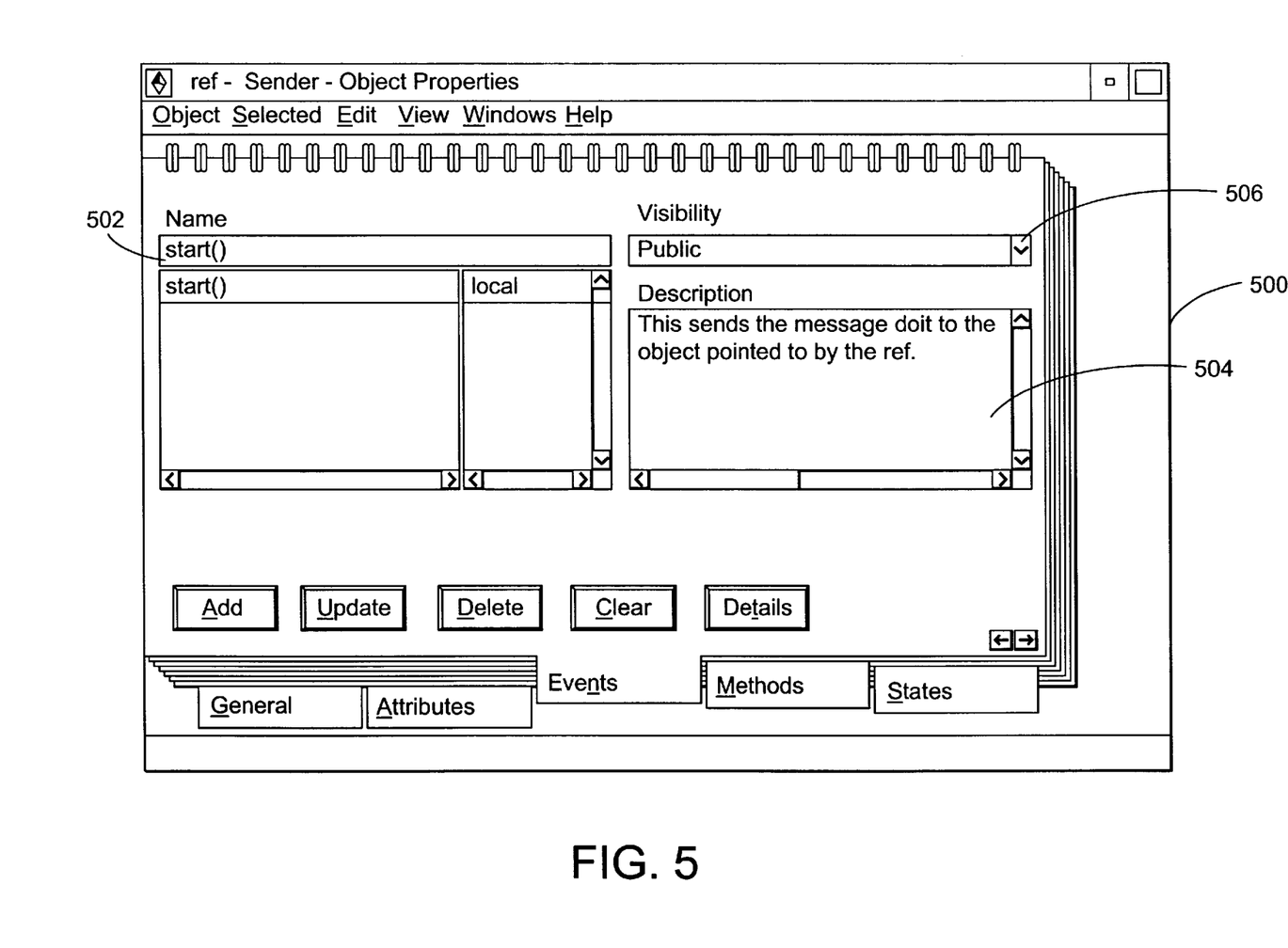
FIG. 5 illustrates an Events window of an Object Properties Notebook displayed by the object modeling tool according to the present invention.

FIG. 5 illustrates an Events window 500 of an Object Properties Notebook displayed by the object modeling tool 110 according to the present invention. The events window 500 describes a message to be sent to the named object for that reference attribute 308. As shown in FIG. 5, name field 502 contains the name of the event, e.g., "start( )." Note that the name of the event is also listed in event pane 310 of window 300 illustrated in FIG. 3.

A description field 504 is provided in window 500 to describe the actions that will be taken once the event named in name field 502 takes place. A visibility field 506 is also provided. The visibility field 506 can be either public or private. If the visibility field is private, then only objects within the same class can receive the message. If the visibility field 506 is public, then any object can receive the message.

Code Window

Figure 6:
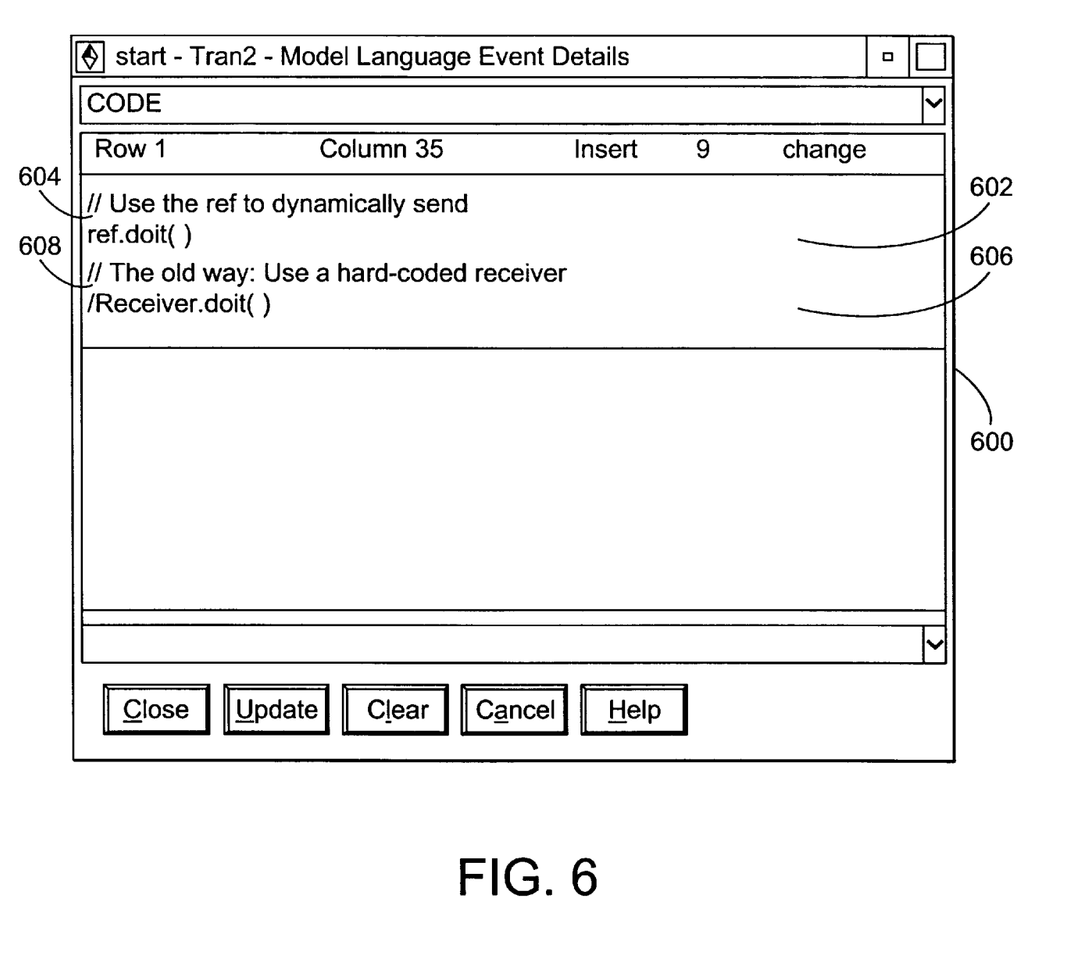
FIGS. 6 and 7 illustrate Code windows displayed by the object modeling tool according to the present invention.
Figure 7:
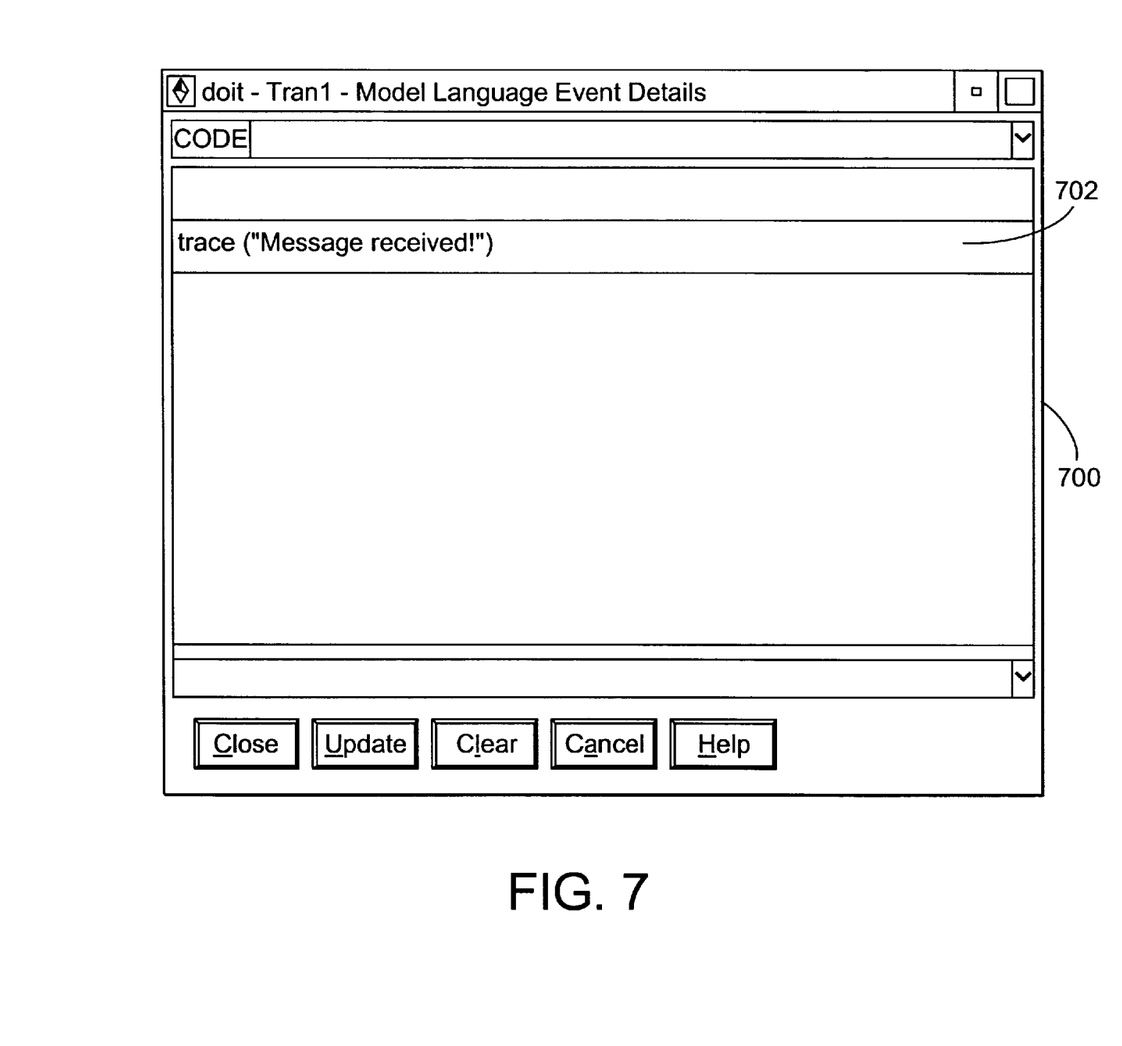

FIGS. 6 and 7 illustrate Code windows 600 and 700 displayed by the object modeling tool 110 according to the present invention.

In FIG. 6, the Code window 600 illustrates the programming for the "start" event. Line 602 is a comment line to describe command line 604. Command line 604 shows a command, ref.doit( ), which is dynamically sent from object Sender 302 upon receiving the event start ( ). Comment line 606 is a comment showing how a message would have been sent without the present invention, namely to hard code a message into name /Receiver.doit( ) as indicated in line 608.

In FIG. 7, the Code window 700 illustrates the programming for the "doit" event, which is associated with object Receiver 304. Executing line 702 shows that the message was sent to object Receiver 304, because the tracing of the message dispatch shows receipt by object Receiver 304.

Event Transition Details

Figure 8:
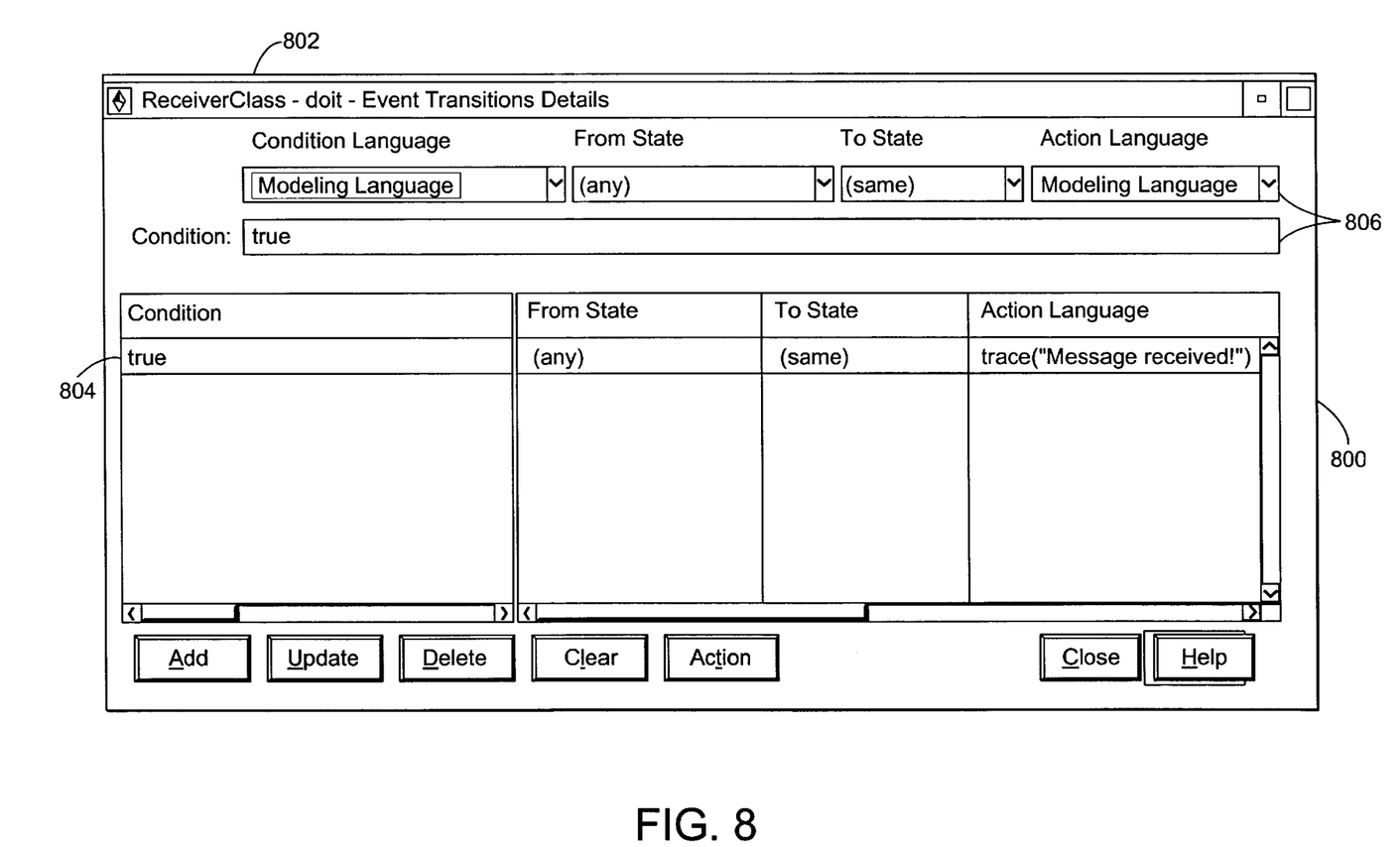
FIG. 8 illustrate Event Transition Details windows displayed by the object modeling tool according to the present invention.

FIG. 8 illustrates Event Transition Details window 800 displayed by the object modeling tool 110 according to the present invention. The Event Transition Details window 800 provides additional details on event transitions in the present invention.

In FIG. 8, window 800 shows the programming that will be executed during execution of the model using the object-oriented tool. Window 800 is associated with object Receiver 304 and event "doit" based on the title block 802. Line 804 shows the conditions, beginning and ending states, and actions taken for the object and message in question. The condition and states can be modified by the user in the update block 806.

Flowchart

Figure 9:
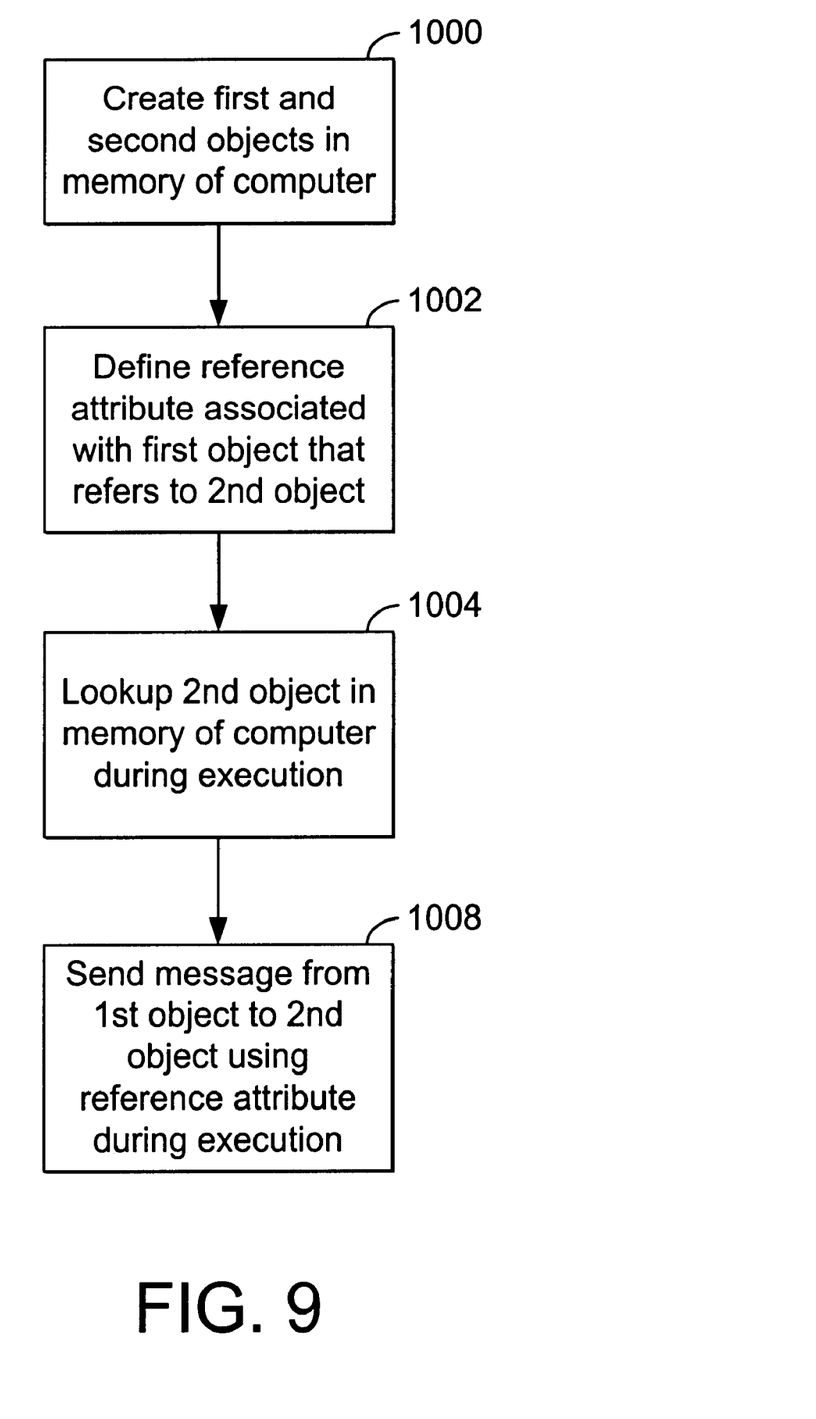
FIG. 9 is a flowchart that illustrates the logic performed by the computer according to the present invention.

FIG. 9 is a flowchart that illustrates the logic performed by the computer 102 according to the present invention.

Block 1000 represents the computer 102 creating a first object and a second object in a memory of a computer. Block 1000 can occur before or during execution of the model. Block 1002 represents the computer 102 defining a reference attribute in the memory of the computer, associated with the first object, that refers to the second object. Block 1002 can occur before or during execution of the model. Block 1004 represents the computer 102 looking up the name of the in the memory of the computer. Block 1004 can occur only during execution of the model.

Block 1006 represents the computer 102 sending a message from the first object to the second object in the memory of the computer using the reference attribute to route the message to the second object. Block 1006 can occur only during execution of the model.

Conclusion

This concludes the description of the preferred embodiment of the invention. The present invention discloses a method, apparatus, and article of manufacture for sending messages between objects in an object-oriented system. A reference attribute for a first object is defined, wherein the reference attribute refers to a second object. A message then may be sent from the first object to the second object using the reference attribute to route the message from the first object to the second object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for broadcasting a message within an object-oriented system, comprising:

creating a first object in a memory of a computer;

defining a reference attribute in the memory of the computer associated with the first object, wherein the reference attribute stores a name of a second object, group of objects or list of objects; and sending a message from the first object to the second object, group of objects or list of objects in the memory of the computer using the reference attribute to route the message from the first object to the second object, group of objects or list of objects.

2. The method of claim 1, further comprising identifying a nested object by identifying a path for the message as a value of the reference attribute.

3. The method of claim 1, wherein a value of the reference attribute is a name of the second object, group of objects or list of objects.

4. The method of claim 3, wherein the name includes path names.

5. The method of claim 1, wherein a value of the reference attribute remains constant throughout an execution of the model simulation.

6. A computerized apparatus for synchronizing elements of an object-oriented system, comprising:

a computer having a memory;

means, performed by the computer, for creating a first object within the memory of the computer;

means, performed by the computer, for defining a reference attribute associated with the first object, wherein the reference attribute stores a name of a second object, group of objects or list of objects; and means, performed by the computer, for sending a message to the second object, group of objects or list of objects using the reference attribute to route the message.

7. The apparatus of claim 6, further comprising means for identifying a nested object by identifying a path for the message as a value of the reference attribute.

8. The apparatus of claim 6, wherein a value of the reference attribute is a name of the second object, group of objects or list of objects.

9. The apparatus of claim 6, wherein the name includes path names.

10. The apparatus of claim 6, wherein a value of the reference attribute remains constant throughout an execution of the model simulation.

11. An article of manufacture comprising a program storage medium readable by a computer having a memory, the medium tangibly embodying one or more programs of instructions executable by the computer to perform method steps for synchronizing elements of an object-oriented system, the method comprising:

creating a first object in a memory of a computer;

defining a reference attribute in the memory of the computer associated with the first object, wherein the reference attribute stores a name of a second object, group of objects or list of objects; and sending a message from the first object to the second object, group of objects or list of objects in the memory of the computer using the reference attribute to route the message to the second object, group of objects or list of objects.

12. The method of claim 11, further comprising identifying a nested object by identifying a path for the message as a value of the reference attribute.

13. The method of claim 11, wherein a value of the reference attribute is a name of the second object, group of objects or list of objects.

14. The method of claim 11, wherein the name includes path names.

15. The method of claim 11, wherein a value of the reference attribute remains constant throughout an execution of the model simulation.

* * * * *

UNITED STATES PATENT AND TRADEMARK OFFICE
CERTIFICATE OF CORRECTION

PATENT NO.     : 6,418,482 B1                                        Page 1 of 1
DATED          : July 9, 2002
INVENTOR(S)    : Stephan A. Brodsky et al.

It is certified that error appears in the above-identified patent and that said Letters Patent is hereby corrected as shown below:

<u>Title page,</u>
Item [75], Inventor
s, after the first occurrence of "Sunnyvale;" insert
-- Dipayan Gangopadhyay, Cupertino --; and after second occurrence of "Sunnyvale;" insert -- Subrata Mitra, San Jose --
Item [22], Filed, "Aug 4, 1997" should read -- May 2, 1997 --

Signed and Sealed this

Twenty-third Day of September, 2003

JAMES E. ROGAN
*Director of the United States Patent and Trademark Office*